(12) United States Patent
Boletis et al.

(10) Patent No.: US 8,791,607 B2
(45) Date of Patent: Jul. 29, 2014

(54) LINEAR DRIVE

(75) Inventors: Alexis Boletis, Lucerne (CH); Hugo Fritschy, Sachseln (CH); Remo Hofstetter, Lucerne (CH); Jens Oliver Schulze, Giswil (CH); Raniero Pittini, Hergiswil (CH); David Ramon, Ennetmoos (CH); Max Erick Busse-Grawitz, Alpnach Dorf (CH)

(73) Assignee: Maxon Motor AG, Sachseln (CH)

( * ) Notice: Subject to any disclaimer, the term of this patent is extended or adjusted under 35 U.S.C. 154(b) by 565 days.

(21) Appl. No.: 13/005,386

(22) Filed: Jan. 12, 2011

(65) Prior Publication Data
US 2011/0175462 A1 Jul. 21, 2011

(30) Foreign Application Priority Data
Jan. 15, 2010 (EP) ..................................... 10150872

(51) Int. Cl.
*H02K 41/03* (2006.01)
*H02K 11/00* (2006.01)

(52) U.S. Cl.
USPC ................... 310/12.19; 310/12.22; 310/12.31

(58) Field of Classification Search
USPC ...................... 310/12.14, 12.19, 12.22, 12.26
See application file for complete search history.

(56) References Cited

U.S. PATENT DOCUMENTS 5,801,462 A * 9/1998 Yagoto et al. .............. 310/12.19
5,952,744 A 9/1999 Chitayat (Continued)

FOREIGN PATENT DOCUMENTS

JP 08-275497 A 10/1996
JP 08-275498 A 10/1996

(Continued)

OTHER PUBLICATIONS

English translation of corresponding Korean Application Notification of the Reasons for Rejection dated Dec. 22, 2011, 4 pps.

(Continued)

*Primary Examiner* — Burton Mullins
*Assistant Examiner* — Eric Johnson
(74) *Attorney, Agent, or Firm* — Buchanan Ingersoll & Rooney PC

(57) ABSTRACT

The present invention relates to an electric linear drive, particularly for a rotary-lifting motor. Such a linear drive includes a winding system including a plurality of wound coils which are arranged to be coaxial to each other and successive in axial direction, and a magnet system which is movable in axial direction relative to the winding system and includes a plurality of axially successive permanent magnets. The winding system is normally fed by a controlled converter. The coils of the winding system and the permanent magnets of the magnet system define an air gap thereinbetween. Furthermore, a sensor is provided for detecting the relative movement of winding system and magnet system and for detecting the relative position of the two systems, the sensor being used for scanning a timing ruler mounted on the outer circumference of the magnet system. The magnet system is radially arranged in the interior of the winding system, and the timing ruler circumferentially extends only over a portion of the circumference of the magnet system. According to the invention it is either provided that the coils of the winding system have a radial bulge for the timing ruler, or that the magnet system is eccentrically arranged relative to the winding system, or that the magnet system includes a radial bulge in the form of a flat portion for the timing ruler.

19 Claims, 6 Drawing Sheets

(56) References Cited

U.S. PATENT DOCUMENTS

| | | | |
|---|---|---|---|
| 5,990,583 A | 11/1999 | Nanba et al. | |
| 6,008,552 A * | 12/1999 | Yagoto et al. | 310/12.14 |
| 6,433,447 B1 * | 8/2002 | Kitazawa et al. | 310/12.14 |
| 6,661,130 B2 * | 12/2003 | Yamazaki et al. | 310/12.14 |
| 7,038,570 B2 * | 5/2006 | McMichael et al. | 337/380 |
| 2009/0261663 A1 * | 10/2009 | Aso et al. | 310/12.02 |

FOREIGN PATENT DOCUMENTS

| | | |
|---|---|---|
| JP | 10201216 | 7/1998 |
| JP | 2000-004575 A | 1/2000 |
| JP | 2001-165271 A | 6/2001 |
| JP | 2004-040894 A | 2/2004 |
| JP | 2004-080848 A | 3/2004 |
| JP | 2004-336842 A | 11/2004 |
| JP | 2006-311715 A | 11/2006 |
| JP | 2007097295 A * | 4/2007 |
| JP | 2007209159 | 8/2007 |
| KR | 20080064970 | 7/2008 |

OTHER PUBLICATIONS

European Search Report for EP 10150872 dated Jun. 28, 2010.
Japanese Office Action issued in corresponding Japanese Patent Application No. P2010-274812 on Sep. 18, 2012.
Japanese Office Action issued in corresponding Japanese Patent Application No. P2012-276067 on Mar. 18, 2014.

* cited by examiner

LINEAR DRIVE

The present invention relates to an electric linear drive, particularly for a rotary-lifting motor according to the preamble of claim 1.

Such a linear drive comprises a winding system including a plurality of wound coils arranged to be coaxial to each other and in successive order in axial direction, and a magnet system which is movable in axial direction relative to the winding system and comprises a plurality of axially successive permanent magnets. The winding system is normally fed by a controlled converter. The coils of the winding system and the permanent magnets of the magnet system define an air gap thereinbetween. Furthermore, a sensor is provided for detecting the relative movement of winding system and magnet system and for detecting the relative position of said two systems, respectively, the sensor being used for scanning a timing ruler mounted on the outer circumference of the magnet system. The magnet system is radially arranged inside the winding system and the timing ruler extends in circumferential direction only over a portion of the circumference of the magnet system.

U.S. Pat. No. 5,952,744 discloses a combined rotary-linear actuator. The hollow cylindrical housing of the actuator accommodates the rotor in its interior, the rotor consisting of axially consecutive and differently magnetized permanent magnet rings. Hence, the rotor, in turn, is a hollow cylindrical sleeve that is mounted via an air bearing to be both rotatable and axially displaceable relative to the housing. On the housing side the rotor is surrounded by differently wound coils. Coils that are longitudinally wound in the axial direction of the actuator are energized for generating a torque, whereas a plurality of coils arranged one after the other in axial direction with a small extension in axial direction serve to generate the drive force in axial direction. A small air gap exists between the coils on the housing side and the permanent magnets of the rotor. The housing is closed at one end, so that the rotor can be moved out of the housing only in one direction. The coils on the housing side are arranged only on the open end of the housing, so that there is a clearance between rotor and housing wall inside the housing between the coils and the closed end of the housing, the clearance being much larger than the air gap between rotor and coils. Sensors which are used for determining the position of the rotor are arranged in said clearance. The position is determined by scanning a bar pattern of a sleeve mounted on the rotor.

The drawback of most of the linear drives known from the prior art is that the magnetic interaction between winding system and magnetic system is impaired by the timing ruler located in the air gap, and the efficiency of the linear drive is thus much poorer in comparison with linear drives without a timing ruler. It is true that linear drives are also known in the case of which the position of the rotor is read not on the rotor itself, but on a shaft arranged inside the hollow cylindrical rotor. An actuator with such position detection is known from JP 2004040894A. This type of position detection, however, requires a complicated mounting of the sensor, which calls for a very large constructional space. Moreover, this type of position detection is much more inaccurate than a direct scanning of the rotor position on the rotor itself.

U.S. Pat. No. 5,990,583 A discloses a linear drive of the above-mentioned type in which the magnet system comprises a radial indentation for the timing ruler in the form of a groove. The timing ruler is embedded in said groove. This construction has the drawback that the manufacture of such a groove turns out to be difficult because of the normally used magnetic materials and requires a time- and cost-intensive treatment of the magnet system. Moreover, such a groove can have a disadvantageous effect on the magnetic flux.

It is therefore the object of the present invention to provide an electric linear drive of the aforementioned type that has a compact design and allows an accurate position-detection by means of a sensor, wherein the efficiency of the linear drive should not be impaired by sensor and timing ruler, if possible. Furthermore, a simple, inexpensive and fast production of the magnet system should be guaranteed.

According to the present invention this object is achieved with the features of the independent claims. Hence, the object is achieved according to the invention when the coils of the winding system have a radial bulge for the timing ruler. The air gap between the coils of the winding system and the permanent magnets of the magnet system can thereby be kept extremely small over most of the circumference, the radial bulge leaving room for the timing ruler. This results in a highly efficient linear drive. The magnetic interaction between winding system and magnet system is not affected by the timing ruler in the area that is not covered by the timing ruler. It is possible to keep the air gap between magnet system and winding system in this area extremely small so as to enhance the efficiency.

It has turned out to be particularly advantageous when the outer circumference of the magnet system forming the inner boundary of the air gap is cylindrical and the coils of the winding system are wound in the form of a closed horseshoe with a circular section and a trapezoidal section, the timing ruler being positioned inside the trapezoidal section of the horseshoe. The trapezoidal section thereby forms the above-mentioned radial bulge of the coils of the winding system.

Alternatively, the magnet system is eccentrically arranged relative to the winding system, whereby room is provided for the timing ruler at one side, and an extremely small air gap is made possible on the opposite side Again alternatively, the magnet system comprises a radial bulge for the timing ruler in the form of a flat portion. In this case, too, the air gap between winding system and magnet system can be kept very small over large portions of the circumference, whereby the flat portion of the magnet system provides room for the timing ruler. In comparison with the groove known from the prior art, a flat portion can be produced easily, at low costs and quickly, and hardly affects the magnetic flux.

Advantageous designs of the present invention are the subject matter of the sub-claims.

A very accurate scanning is achieved by means of an optical sensor. Alternatively, capacitive or inductive sensors are also suited for exactly scanning corresponding timing rulers.

In a preferred embodiment, the sensor is arranged in the winding system on the air gap, at least one coil of the winding system being respectively arranged in the axial direction of the winding system at both sides of the sensor. For instance, the sensor is optimally protected against soiling or external impacts. Preferably, the sensor is arranged in axial direction in the center of the winding system. Owing to the arrangement of the sensor directly on the air gap, a very accurate position-detection is possible.

Advantageously, the timing ruler extends in circumferential direction of the magnet system along less than 20% of the circumference of the magnet system. As a result, the magnetic interaction between the winding system and the magnet system over a very large portion of the circumference is not impaired by the timing ruler positioned in the air gap. The drive power of the linear drive and its thrust force, respectively, can thereby be enhanced.

In a further preferred embodiment a sensor carrier integrated for accommodating the sensor in the winding system comprises an axially extending groove for guiding the timing ruler. This can prevent an undesired rotation of the magnet system relative to the winding system. Owing to the sensor carrier integrated into the winding system a very accurate positioning of the sensor and also an optimized protection of the sensor against various external influences, particularly soiling, is achieved. Alternatively, the magnet system can be guided by one or a plurality of slide pins to be non-rotatable in relation to the winding system.

In a further preferred embodiment the magnet system is rotatably supported on a shaft by means of ball bearings or duplex bearings. This permits a rotation of the shaft that is co-moved in axial direction with the magnet system while the magnet system is simultaneously held in a rotationally fixed manner relative to the winding system. When the shaft is made to rotate, the inertia is thus smaller than in a co-rotating magnet system.

Preferably, the electric linear drive is provided in combination with a rotary motor with integrated linear guide.

In a further preferred embodiment of the present invention at least one opening that is equipped with a dust filter is provided on each of the two axial ends of the electric linear drive. An air exchange for pressure compensation can thereby be directed in a selective way to the outside in such a manner that there is hardly any flow through the remaining passages in various bearings, guides and diverse cable bushings, and the exchanged air is low in dust.

The winding system can be thermally connected to a housing, the winding system being enclosed by the housing, and the housing consisting of a material of high thermal conductivity, and the housing being further connected to a cooling body with cooling ribs and/or inner cooling channels and/or outer cooling channels. The heat evolving during operation of the linear drive can thereby be transferred or discharged to the outside in an optimum way. This can considerably improve the performance of the electric linear drive.

The winding system may also be composed of a plurality of sub-systems which can be fed separately by a plurality of converters.

Advantageous embodiments of the present invention shall now be explained in more detail hereinafter with reference to drawings, in which.

Like members will be designated by like reference numerals hereinafter.

Figure 1:
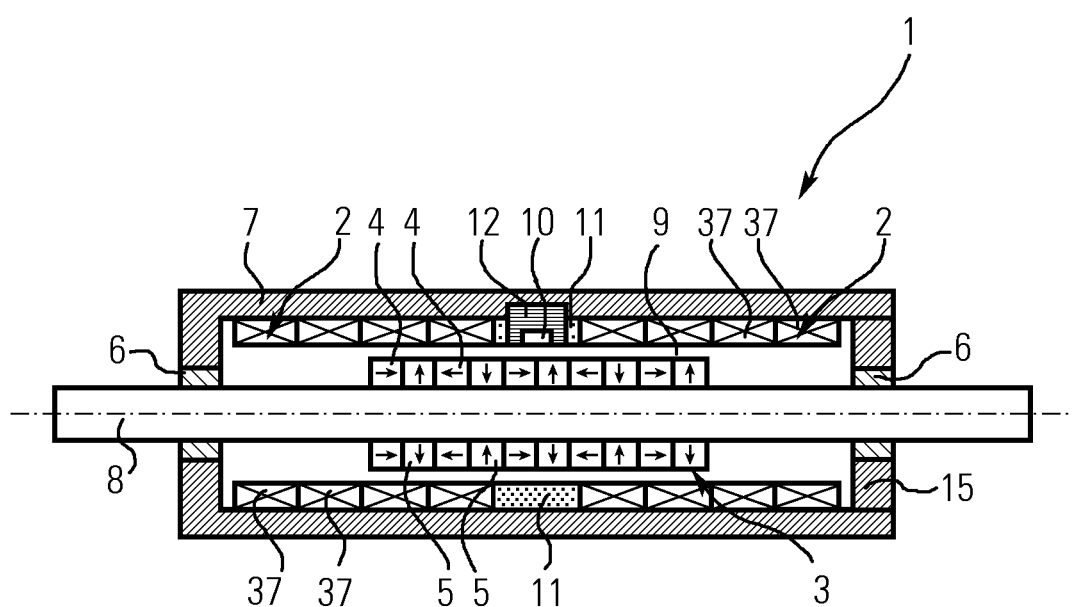
FIG. 1 is a longitudinal section through a linear drive according to the invention in a first embodiment.

FIG. 1 shows a first embodiment of a linear drive 1 according to the invention. The hollow cylindrical winding system 2 of the linear drive 1 is connected in a rotationally fixed manner and coaxially to a housing 7 which is also hollow cylindrical. The winding system 2 consists of a plurality of coils 37 that are arranged to be coaxial to each other and in successive order in axial direction. The housing 7 of the linear drive 1 is of a closed type on the left side and is closed on the right side by a housing lid 15. The shaft 8 of the linear drive 1 which is arranged to be concentric to the housing 7 is supported to be both rotatable and axially displaceable in the housing 7 via two slide bearings or ball bushings 6 of the left closed housing side and the housing lid 15, respectively. The shaft 8 of the linear drive 1 is enclosed in a central sub-portion by a hollow cylindrical magnet system 3 which is connected in a rotationally fixed manner to the shaft 8. The axial length of the magnet system 3 is here much smaller than the axial length of the winding system 2 and the housing 7, respectively, so that the shaft 8 with the magnet system 3 can be reciprocated in axial direction. The magnet system 3 consists of annular and respectively alternatingly successively arranged, axially magnetized permanent magnets 4 and of radially magnetized permanent magnets 5.

The plotted small arrows of the axially magnetized permanent magnets 4 and of the radially magnetized permanent magnets 5, respectively, are indicative of the magnetization direction and thus of the flux direction of the magnetic field. Owing to the alternating arrangement of the axially magnetized and radially magnetized magnet rings a so-called Halbach array is approximated. The recurring sequence respectively consists in successive order of a ring magnetized axially from the left to the right side, a magnetized ring magnetized radially to the outside, a magnetized ring magnetized axially from the right to the left side, and a ring magnetized in radial direction inwards. A force acting in axial direction for driving the linear drive 1 is generated by alternatingly energizing the various coils of the winding system 2 and thus by the magnetic fields of the winding system coils which are generated by the current flow and are acting on the permanent magnets of the magnet system 3. The smaller the air gap 9 between the magnet system 3 and the surrounding winding system 2 is, the better can the magnetic interaction between the magnetic fields, which are generated by the coils of the winding system 2, and the permanent magnets of the magnet system 3 be converted into a driving force. Viewed axially centrally in the winding system 2, a sensor is arranged on the air gap 9 for the positional detection of the magnet system 3 and of the shaft 8, respectively, which is connected to the magnet system 3. The sensor 10 can be configured to be e.g. of an optical, capacitive, inductive or magnetic type and is seated on a printed circuit board 12 for evaluating and transmitting the sensor signals. Sensor 10 and printed circuit board 12 have a small extension in the circumferential direction of the winding system 2 and are held in position by a substantially annular sensor carrier 11 which is firmly connected either to the winding system 2 or to the housing 7.

The support of the shaft 8 as shown in FIG. 1 by two slide bearings 6 is advantageous in its manufacture, but prone to play.

Figure 2:
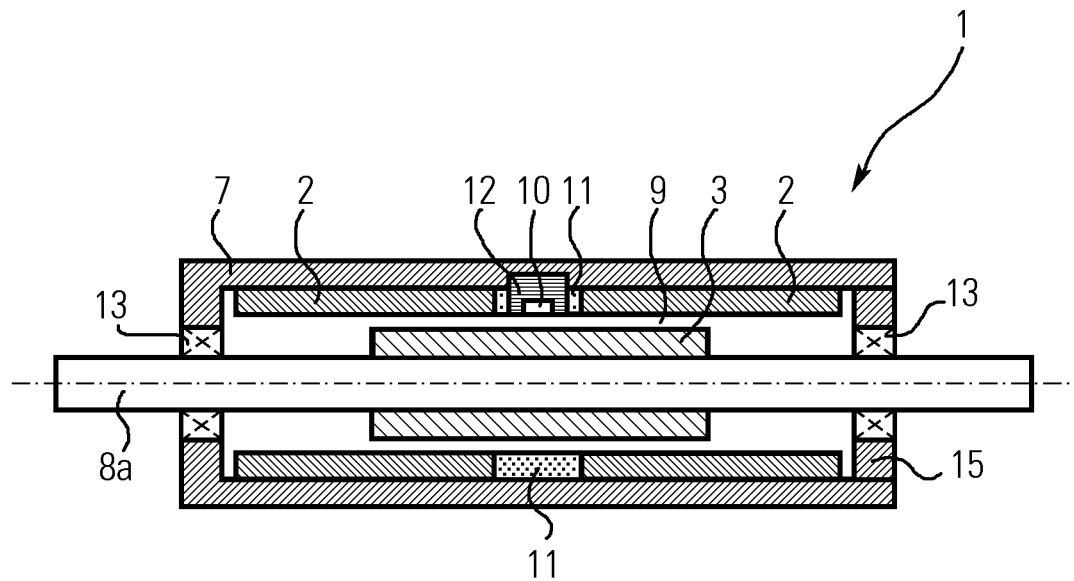
FIG. 2 is a longitudinal section through a second embodiment of a linear drive according to the invention.

FIG. 2 shows a linear guide option without play. The illustrated linear drive 1 is substantially identical in its construction with the one of the embodiment shown in FIG. 1.

Figure 3:
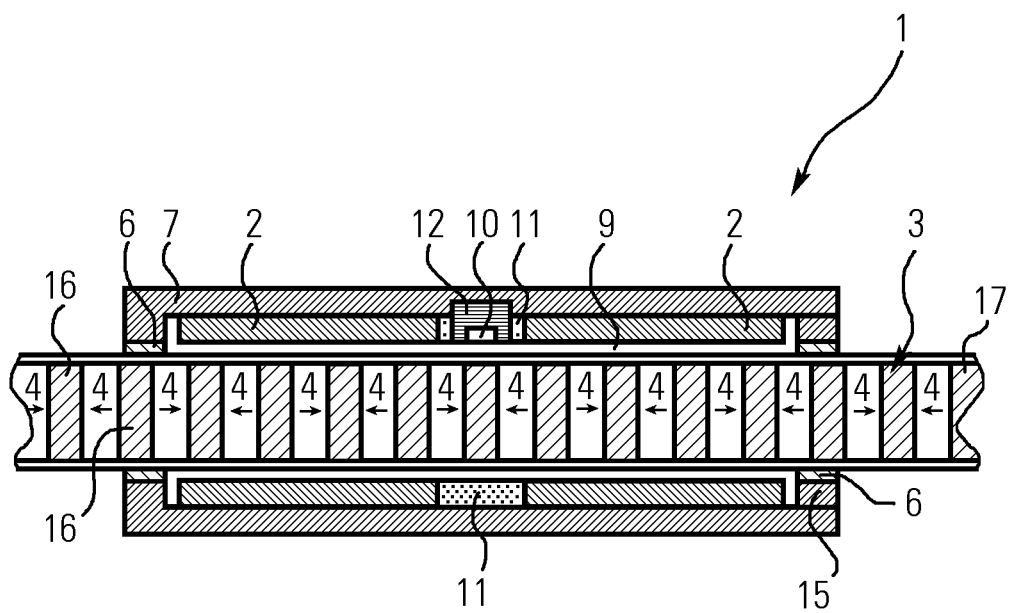
FIG. 3 is a longitudinal section through a third embodiment of a linear drive according to the invention.

In FIG. 2 and in all of the consecutive figures, the coils of the winding system 2 are not shown, but the arrangement of the coils is nevertheless analogous to FIG. 1 in all figures. However, the shaft of the linear drive 1 shown in FIG. 2 is configured as a ball spline 8a. The linear guide is implemented via two ball spline guides 13 without play. The shaft 8a of the linear drive 1 shown in FIG. 2 is therefore not rotatable, but is just axially slidably supported in the housing 7 of the linear drive 1. This type of linear drive can be used as a pure linear drive. If the linear drive 1 of FIG. 3 is to be used in a rotary-lifting motor, the axially movable shaft 8a of the linear drive 1 is connected to the stator of a rotary motor. Since in such a case the whole mass of the rotary motor has to be reciprocated in axial direction by the linear drive 1, said combination is suited for use in small and thus lightweight rotary motors.

The embodiment of a linear drive 1 of the invention as shown in FIG. 3 is of a similar structure as the embodiment of FIG. 1. In contrast to the embodiment of FIG. 1, the shaft of the linear drive 1 is formed by the magnet system 3 itself. The magnet system 3 consists of axially consecutively arranged disks, consisting alternatingly of an axially magnetized permanent magnet disk and a consecutive, magnetically soft disk 16 as flux collector. The magnetization direction of two successive, axially magnetized permanent-magnet disks 4 is each time oriented in opposite direction and is illustrated in FIG. 3 by the plotted small arrows. The magnet system 3, which is cylindrical on the whole, is surrounded by a thin sleeve or coating 17 serving as a timing ruler for the sensor 10.

Figure 4:
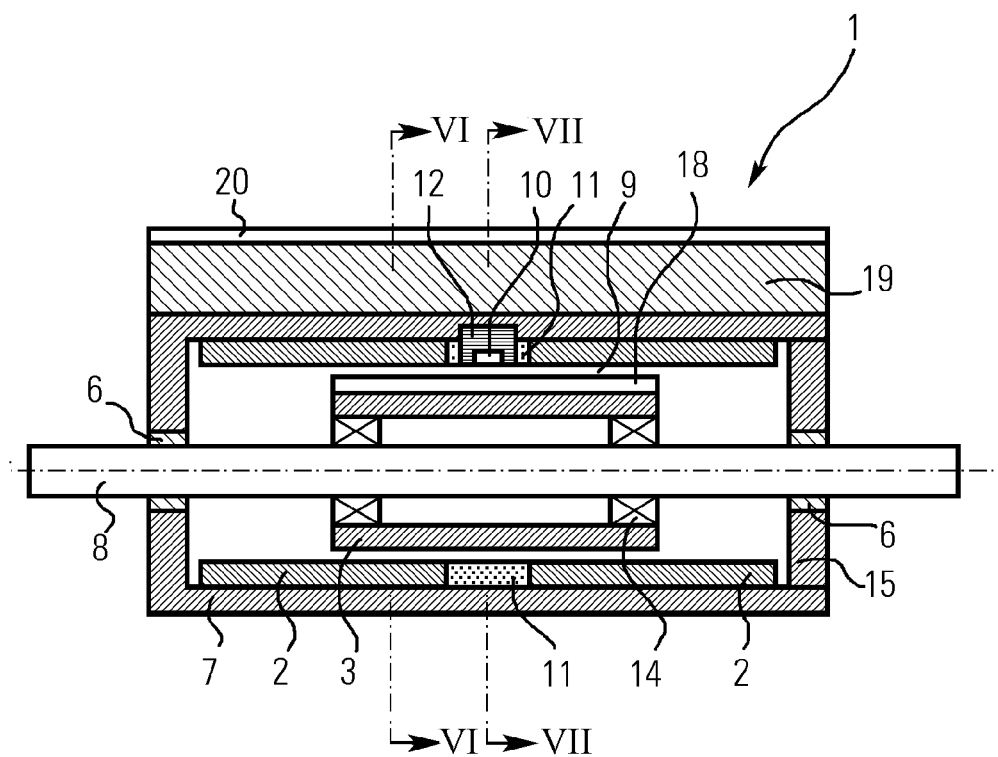
FIG. 4 is a longitudinal section through a linear drive according to the invention in a fourth embodiment.
Figure 5:
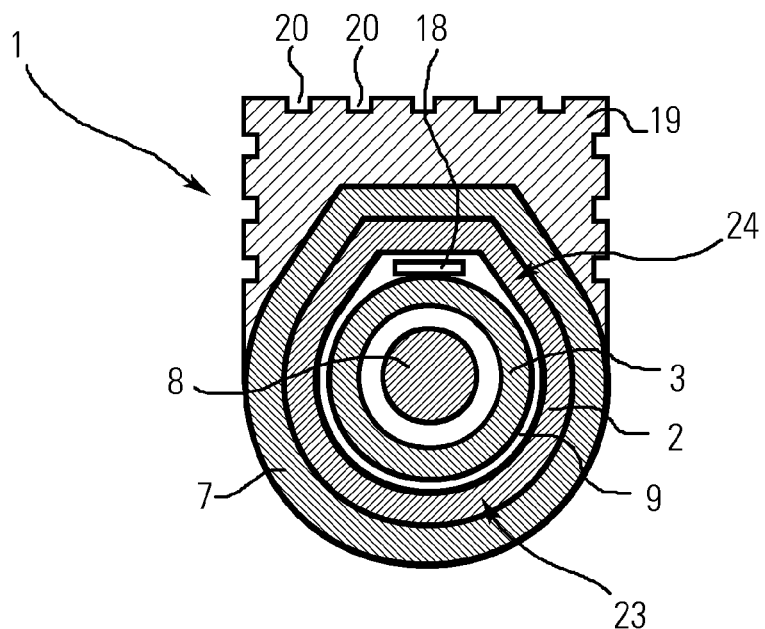
FIG. 5 is a cross section of the linear drive according to the invention of FIG. 4 along the sectional lines VI-VI shown in FIG. 4.
Figure 6:
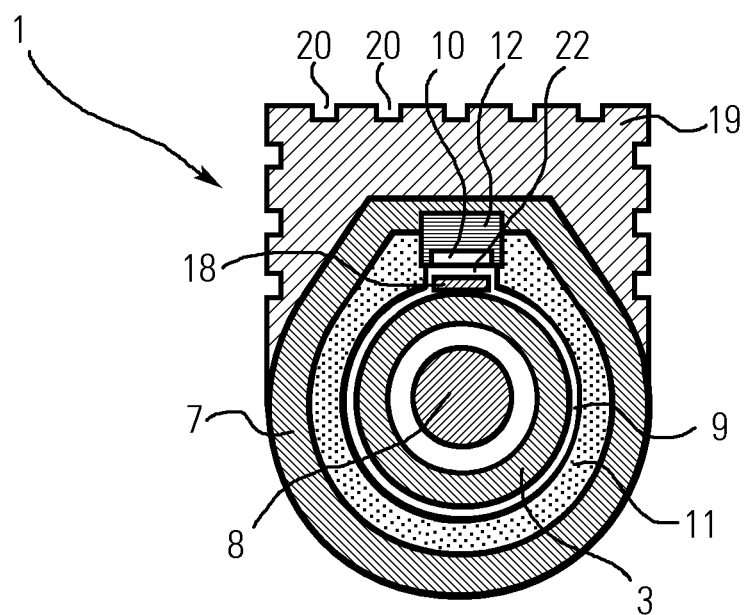
FIG. 6 is a cross-sectional illustration of the linear drive shown in FIG. 4 along the sectional lines VII-VII marked in FIG. 4.

FIGS. 4 to 6 show a further embodiment of the linear drive 1 according to the invention, which corresponds in essential parts of its structure to the embodiment shown in FIG. 1. In this instance, too, the shaft 8 of the linear drive is supported both in an axially displaceable and rotatable manner via the slide bearings or ball bushings 6 on the housing 7 and the housing lid 15, respectively. The magnet system 3 is supported via two ball bearings 14 to be rotatable about the shaft 8, so that the magnet system 3 is not co-rotated with the shaft 8. This allows a rotation of the shaft by a rotary motor without the magnet system having to be equipped over the whole circumference with a timing ruler for the sensor. Apart from this, the rotational inertia is thereby reduced. The magnet system 3 is held by suitable anti-rotation means in a rotationally fixed manner relative to the housing 7. At the circumferential position on which the sensor 10 is arranged on the housing side in the sensor carrier 11, an elongated timing ruler 18 is mounted on the magnet system 3. The timing ruler 18 permits a position-detection by the sensor 10 that is as accurate as possible. An extremely accurate position-detection is here achieved with the help of an optical sensor if the timing ruler has a linear pattern of fine resolution with lines extending in a direction transverse to the axial direction.

As shown in FIG. 5, the winding system 2 very narrowly encloses the internally located magnet system 3 with a lower circular section 23, so that the air gap 9 between winding system 2 and magnet system 3 remains as small as possible over a large portion in circumferential direction. A trapezoidal section 24 of the coils of the winding system 2, the coils being wound in the form of a horseshoe, creates a bulge in the winding system 2 that provides the space needed for the timing ruler 18. As can be seen in FIG. 6, the magnet system 3 with the timing ruler 18 is guided to be rotationally fixed relative to the housing 7 and axially movable. Guiding is implemented by an axially extending groove 22 of the sensor carrier 11, with the help of which the magnet system 3 is prevented from rotating over the timing ruler 18 extending in the groove 22.

A cooling body 19 which extends over the whole length of the housing 7 of the linear drive 1 is mounted on the housing 7 of the embodiment shown in FIGS. 4 to 6 of a linear drive 1 according to the invention. The housing 7 is thermally connected to the cooling body 19. The cooling body 19 comprises cooling ribs 20 axially extending for heat discharge. Instead of cooling ribs, the cooling body can also comprise axially extending outer and/or inner cooling channels (not shown) through which a cooling fluid is circulated for heat discharge. It is in principle possible to provide each of the illustrated embodiments with such a cooling body 19.

Figure 7:
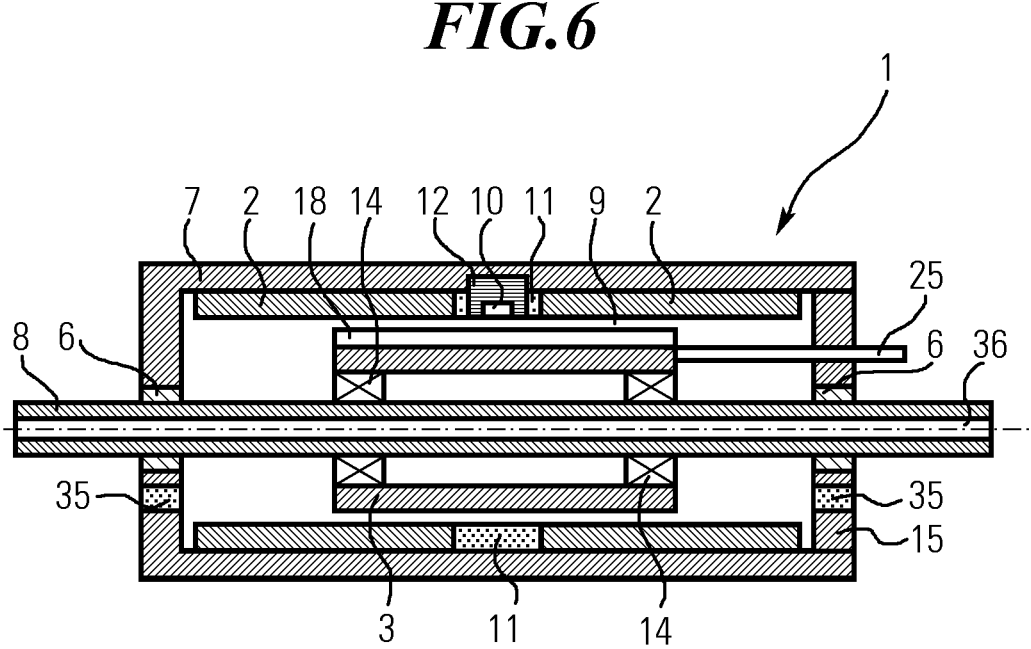
FIG. 7 is a longitudinal section through the linear drive according to the invention of FIG. 4 in a slightly modified form.

FIG. 7 shows a slight modification of the embodiment which is illustrated in FIGS. 4 to 6 and regards a linear drive 1 according to the invention. An elongated slide pin 25 which extends in parallel with the shaft 8 is connected to the magnet system 3. The slide pin 25 is guided in a corresponding bore of the housing lid 15. It serves to prevent rotation of the magnet system 3 relative to the housing 7 and may be provided either as an alternative or in addition to the solution shown in FIG. 6 with the timing ruler 18 extending in an axial groove 22 of the sensor carrier 11. The sole guidance via the slide pin 25 prevents the risk of wear of the timing ruler and the sensor carrier 11, respectively, and thus soiling of the sensor 10. The shaft 8 of the linear drive 1 comprises a continuous bore 36 so that a vacuum connection can be guided through the shaft 8 for easily accommodating workpieces. An opening with a dust filter 35 is provided axially on each of the two ends of the linear drive 1. As a result, an air exchange for pressure compensation is directed outwards in a selective way such that there is hardly any flow through the remaining passages in the bearings, in the guides and in various cable bushings, and the exchanged air is low in dust.

Figure 8:
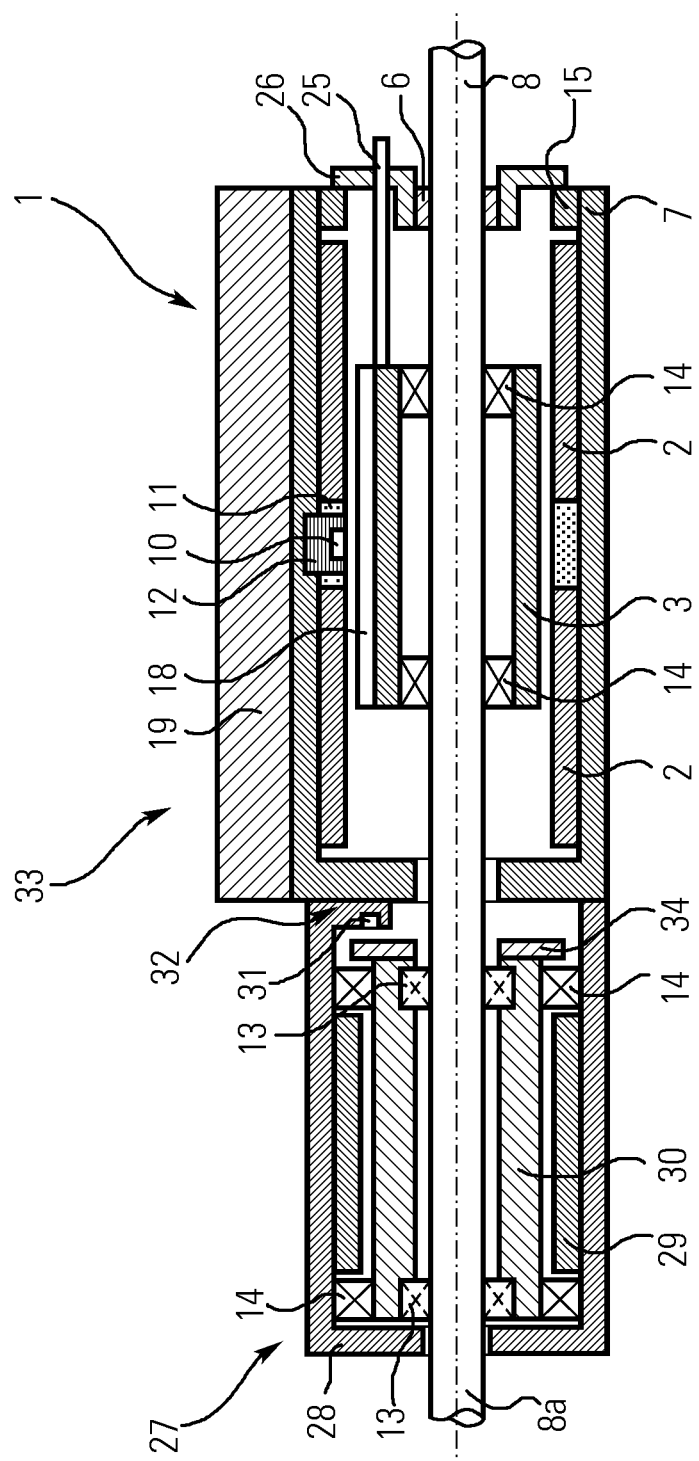
FIG. 8 is a longitudinal section through a rotary-lifting motor with an integrated linear drive according to FIG. 7.

Finally, FIG. 8 shows the linear drive 1 illustrated in FIG. 7 in a combined rotary-lifting motor 33. A rotary motor 27 is flanged from the left side to the linear drive 1. The shaft 8 of the linear drive is extended to the left side, thereby simultaneously forming the shaft of the rotary motor 27. In the area of the rotary motor 27 the shaft 8 is designed as a ball spline 8a. The rotary motor 27 consists of a housing 28, a hollow cylindrical winding 29 enclosed by the housing 28 and a magnet carrier 30 connected to the shaft in a rotationally fixed manner and including a plurality of permanent magnets. The non-rotational support of the magnet carrier 30 is provided via two ball spline guides 13. The magnet carrier 30 is rotatably supported by means of ball bearings 14 relative to the housing. The shaft 8 and 8a, respectively, is thus just made axially displaceable via the ball spline guides 13 relative to the magnet carrier 30 and co-rotates with the magnet carrier 30. The shaft 8 and 8a, respectively, is thereby moved by the rotary motor 27 in rotary direction and is moved by the linear drive 1 in axial direction. The rotary motor 27 also includes a sensor 31 for detecting the angular position and for measuring the rotational speed. The sensor 31 is connected via a sensor carrier 32 to the housing 28 of the rotary motor 27 and scans an encoder disk 34 which is connected to the magnet carrier 30 and co-rotates with the magnet carrier 30. In a slight modification regarding FIG. 7 the linear drive 1 comprises a radially adjustable or self-aligning flange 26 at the right side for additionally supporting the shaft. The illustrated linear drive further comprises a cooling body 29 by analogy with the embodiments shown in FIGS. 4 to 6. The shafts 8 and 8a, respectively, of the rotary-lifting motor 33 preferably comprises a continuous bore (not shown) in conformity with the bore 36 shown in FIG. 7, whereby a vacuum connection can be guided through the shaft 8 and 8a, respectively, for easily accommodating workpieces. A suction device is provided for this purpose at a workpiece end of the shaft. Furthermore, the rotary-lifting motor 33 preferably comprises a parking position. In said parking position the shaft 8 and 8a is in a retracted position and is there held in position e.g. by a magnet.

While the shaft of each of the illustrated embodiments projects at both sides from the respective housing, it is also possible with the help of divided shafts that the shaft projects at just one end out of the housing. Corresponding variants are known to the skilled person.

Figure 9A:
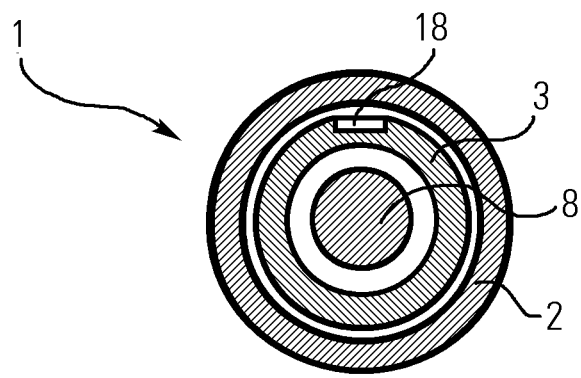
FIG. 9a is a schematic cross-section through a further linear drive according to the invention.
Figure 9B:
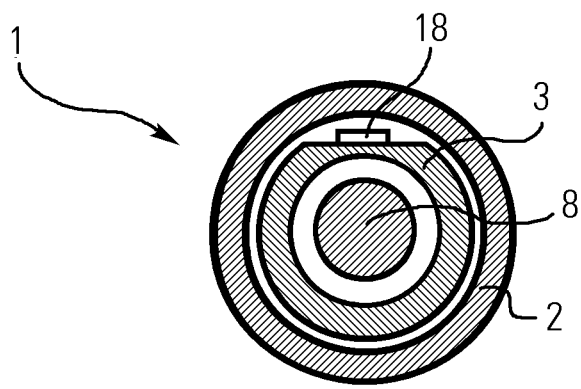
FIG. 9b is a schematic cross-section through a further linear drive according to the Invention.
Figure 9C:
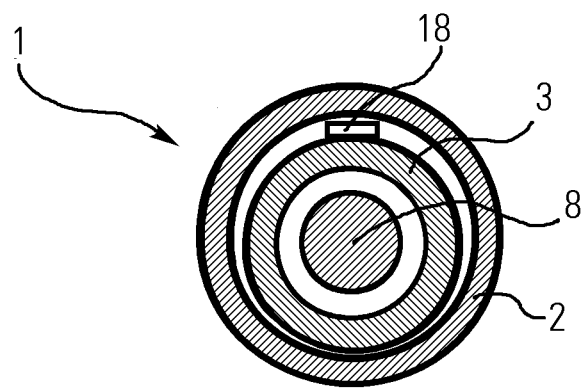
FIG. 9c is a schematic cross-section through a further linear drive according to the invention.

Each of FIGS. 9a, 9b and 9c shows a schematic cross-section through a linear drive 1. All of the three figures show alternatives to the coils of the winding system 2, which coils are shown in FIGS. 5 and 6 and are wound in the form of a horseshoe. The coils wound in the form of a horseshoe and shown in FIGS. 5 and 6 have a bulge for the timing ruler 18, whereas the necessary space for the timing ruler 18 according to FIGS. 9a and 9b is provided by an indentation of the magnet system 3. As is known from the prior art and shown in FIG. 9a, the indentation may be a groove of the magnet system 3. According to the invention, however, preference should be given to a flat portion of the magnet system 3 according to FIG. 9b. In both cases the winding system 2 is configured to be hollow cylindrical and need not have a bulge for the timing ruler. FIG. 9c shows a further possibility of providing the necessary space for the timing ruler 18. Both winding system 2 and magnet system 3 are here hollow cylindrical without any bulge or indentation. The necessary space for the timing ruler 18 is obtained by way of a slightly eccentric arrangement of magnet system 3 and winding system 2. In the lower portion, magnet system 3 and winding system 2 are closely side by side, so that the interposed air gap is small at said place. In the upper portion there is an increased distance between magnet system 3 and winding system 2 because of the slightly eccentric arrangement, whereby the necessary space is created for the timing ruler 18 fastened to the outer circumference of the magnet system 3. FIGS. 9a to 9c just show the schematic structure of the linear motor 1 in cross-section. The alternatives shown in FIGS. 9a to 9c with respect to the coils of the winding system 2 wound in the manner of a horseshoe can e.g. be implemented in the linear motors of FIGS. 4 to 8.

The invention claimed is:

1. An electric linear drive comprising:
a winding system including a plurality of wound coils which are arranged to be coaxial to each other and successive in axial direction;
a magnet system which is movable in an axial direction relative to the winding system and comprises a plurality of axially successive permanent magnets, the coils of the winding system and the permanent magnets of the magnet system defining an air gap therebetween; and
a sensor for detecting relative movement of the winding system and magnet system, for detecting a relative position of said winding and magnet systems, and for scanning a timing ruler mounted on an outer circumference of the magnet system, said magnet system being radially arranged in an interior of the winding system, and the timing ruler circumferentially extending over a portion of the circumference of the magnet system, wherein the coils of the winding system have a radial bulge accommodating the timing ruler.

2. The electric linear drive according to claim 1, wherein the outer circumference of the magnet system forming the inner boundary of the air gap is cylindrical, and the coils of the winding system are wound as a closed horseshoe with a circular section and a trapezoidal section, the timing ruler being located inside the trapezoidal section of the horseshoe.

3. An electric linear drive comprising:
a winding system having an axis and including a plurality of wound coils which are arranged to be coaxial to each other and successive in axial direction;
a magnet system having an axis, the magnet system being movable in an axial direction relative to the winding system and comprising a plurality of axially successive permanent magnets, the coils of the winding system and the permanent magnets of the magnet system defining an air gap therebetween; and
a sensor for detecting relative movement of the winding system and magnet system, for detecting a relative position of said winding and magnet systems, and for scanning a timing ruler mounted on an outer circumference of the magnet system, said magnet system being radially arranged in an interior of the winding system, and the timing ruler circumferentially extending over a portion of the circumference of the magnet system, wherein the axis of the magnet system is eccentrically arranged relative to the axis of the winding system.

4. An electric linear drive comprising:
a winding system including a plurality of wound coils which are arranged to be coaxial to each other and successive in axial direction;
a magnet system which is movable in an axial direction relative to the winding system and comprises a plurality of axially successive permanent magnets, the coils of the winding system and the permanent magnets of the magnet system defining an air gap therebetween; and
a sensor for detecting relative movement of the winding system and magnet system, for detecting a relative position of said winding and magnet systems, and for scanning a timing ruler mounted on an outer circumference of the magnet system, said magnet system being radially arranged in an interior of the winding system, and the timing ruler circumferentially extending over a portion of the circumference of the magnet system, wherein a sensor carrier integrated into the winding system for accommodating the sensor comprises an axially extending groove for guiding the timing ruler.

5. The electric linear drive according to claim 1, wherein the sensor is an optical, capacitive or inductive sensor.

6. The electric linear drive according to claim 1, wherein the sensor is arranged in the winding system on the air gap, wherein at least one coil of the winding system is respectively arranged in axial direction of the winding system at both sides of the sensor.

7. The electric linear drive according to claim 1, wherein a sensor carrier integrated into the winding system for accommodating the sensor comprises:
an axially extending groove for guiding the timing ruler, or the magnet system is guided by one or a plurality of sliding pins to be non-rotatable in relation to the winding system.

8. The electric linear drive according to claim 1, wherein the magnet system is rotatably supported on a shaft by ball bearings or duplex bearings.

9. The electric linear drive according to claim 1, wherein the electric linear drive is provided in combination with a rotary motor with integrated linear guidance.

10. The electric linear drive according to claim 1, wherein at least one opening equipped with a dust filter is provided on both axial ends of the electric linear drive.

11. The electric linear drive according to claim 3, wherein the sensor is an optical, capacitive or inductive sensor.

12. The electric linear drive according to claim 4, wherein the sensor is an optical, capacitive or inductive sensor.

13. The electric linear drive according to claim 3, wherein the sensor is arranged in the winding system on the air gap, wherein at least one coil of the winding system is respectively arranged in axial direction of the winding system at both sides of the sensor.

14. The electric linear drive according to claim 4, wherein the sensor is arranged in the winding system on the air gap, wherein at least one coil of the winding system is respectively arranged in axial direction of the winding system at both sides of the sensor.

15. The electric linear drive according to claim 3, wherein a sensor carrier integrated into the winding system for accommodating the sensor comprises:
  an axially extending groove for guiding the timing ruler, or the magnet system is guided by one or a plurality of sliding pins to be non-rotatable in relation to the winding system.

16. The electric linear drive according to claim 3, wherein the magnet system is rotatably supported on a shaft by ball bearings or duplex bearings.

17. The electric linear drive according to claim 4, wherein the magnet system is rotatably supported on a shaft by ball bearings or duplex bearings.

18. The electric linear drive according to claim 3, wherein the electric linear drive is provided in combination with a rotary motor with integrated linear guidance.

19. The electric linear drive according to claim 4, wherein the electric linear drive is provided in combination with a rotary motor with integrated linear guidance.

* * * * *